United States Patent
Kwon et al.

(10) Patent No.: US 12,344,482 B2
(45) Date of Patent: Jul. 1, 2025

(54) DRIVING BELT INSPECTION DEVICE AND METHOD FOR WAFER TRANSFER MODULE

(71) Applicant: RESEARCH & BUSINESS FOUNDATION SUNGKYUNKWAN UNIVERSITY, Suwon-si (KR)

(72) Inventors: Dae Il Kwon, Suwon-si (KR); Hee Jae Goo, Suwon-si (KR)

(73) Assignee: RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 131 days.

(21) Appl. No.: 18/377,440

(22) Filed: Oct. 6, 2023

(65) Prior Publication Data

US 2024/0132295 A1    Apr. 25, 2024

(30) Foreign Application Priority Data

Oct. 12, 2022    (KR) .......................... 10-2022-0130425

(51) Int. Cl.
*B65G 43/00* (2006.01)
*B25J 9/04* (2006.01)
(Continued)

(52) U.S. Cl.
CPC .............. *B65G 43/00* (2013.01); *B25J 9/042* (2013.01); *B65G 43/02* (2013.01); *B65G 43/04* (2013.01); *B65G 2201/0297* (2013.01)

(58) Field of Classification Search
CPC ........................ B65G 2201/0297; B65G 43/00; B65G 43/02; B65G 43/04; B25J 9/042
(Continued)

(56) References Cited

U.S. PATENT DOCUMENTS

| | | | | | |
|---|---|---|---|---|---|
| 3,922,661 | A | * | 11/1975 | Enabnit | B65G 43/02 340/676 |
| 6,988,610 | B2 | * | 1/2006 | Fromme | G06V 10/40 198/810.02 |

(Continued)

FOREIGN PATENT DOCUMENTS

| | | | | | |
|---|---|---|---|---|---|
| GB | 2429789 | A | * | 3/2007 | ............ B65G 43/02 |
| JP | 9-196131 | A | | 7/1997 | |

(Continued)

OTHER PUBLICATIONS

"Failure Diagnosis Method of Changed Belt Tension for Timing Belt Drive System in Wafer Transfer Robot based on Motor Current Signal," PHM Korea 2022 Conference, Jun. 29-Jul. 1, 2022, (1 Page mostly in Korean).

*Primary Examiner* — James R Bidwell

(57) ABSTRACT

A driving belt inspection device and method for a wafer transfer module is disclosed. The driving belt inspection device for a wafer transfer module includes: a data receiving unit for receiving current data of a motor connected to a driving belt; a calculation unit for calculating the rate of change of instantaneous current of the motor according to the received current data and acquiring a calculated value for inspection according to the calculated rate of change of instantaneous current of the motor; and a result determination unit for determining, if the calculated value is lower than a first reference value, that the driving belt is in a normal operation state, and determining, if the calculated value is higher than a second reference value, that the driving belt is in an abnormal operation state.

12 Claims, 17 Drawing Sheets

(51) Int. Cl.
*B65G 43/02* (2006.01)
*B65G 43/04* (2006.01)

(58) Field of Classification Search
USPC .................................................. 198/810.02
See application file for complete search history.

(56) References Cited

U.S. PATENT DOCUMENTS

| | | | | |
|---|---|---|---|---|
| 8,157,085 | B2* | 4/2012 | Furukawa | B65G 43/02 198/810.04 |
| 8,478,175 | B2* | 7/2013 | Murai | G03G 15/168 399/303 |
| 2009/0178902 | A1* | 7/2009 | Lynn | G01M 13/023 198/810.02 |
| 2009/0266684 | A1* | 10/2009 | Nishikita | B65G 43/02 198/810.02 |
| 2023/0257208 | A1* | 8/2023 | Harrell | B65G 23/14 198/810.02 |
| 2023/0271787 | A1* | 8/2023 | Baggio | G01K 13/04 198/810.02 |

FOREIGN PATENT DOCUMENTS

| | | |
|---|---|---|
| JP | 9-262889 A | 10/1997 |
| JP | 4044700 B2 | 2/2008 |
| KR | 10-0387457 B1 | 6/2003 |
| KR | 10-0856301 B1 | 9/2008 |

* cited by examiner

FIG. 14

|          | 55 N   | 49 N   | 43 N   | 10 N   |
|----------|--------|--------|--------|--------|
| Mean     | 0.3489 | 0.3410 | 0.2612 | 0.0903 |
| Variance | 0.0148 | 0.0049 | 0.0017 | 0.0001 |

DRIVING BELT INSPECTION DEVICE AND METHOD FOR WAFER TRANSFER MODULE

CROSS-REFERENCE TO RELATED APPLICATIONS

The present application claims the benefit of Korean Patent Application No. 10-2022-0130425 filed in the Korean Intellectual Property Office on Oct. 12, 2022, the entire contents of which are incorporated herein by reference.

BACKGROUND

1. Field

The present disclosure relates to a driving belt inspection device and method for a wafer transfer module, more specifically to a driving belt inspection device and method for a wafer transfer module that is capable of measuring the rate of change of instantaneous current of a motor connected dynamically to a driving belt of the wafer transfer module to inspect the deterioration of the driving belt.

2. Description of the Related Art

A variety of studies have been made in the semiconductor manufacturing industry to improve the efficiency of manufacturing equipment and the reliability of semiconductor parts. Further, various robots (or manufacturing modules) are used to manufacture semiconductors.

Among them, a wafer transfer module in semiconductor manufacturing equipment is used to transfer (or move) a wafer. To transfer the wafer, the wafer transfer module includes arm structures each having a motor for generating a driving force and a belt and a pulley connected dynamically to the motor so that the generated driving force is transferred to a rotary shaft of the corresponding arm structure.

If loads are repeatedly applied to the belts of the wafer transfer module, the belts become deteriorated to lower the accuracy in position in the operations of the arm structures of the wafer transfer module.

If so, the wafer, the wafer transfer module, or equipment located close to the wafer and the wafer transfer module may be damaged.

PRIOR ART LITERATURE

Patent Literature (Patent literature 1) Korean Patent No. 10-0856301 (Issued on Aug. 27, 2008)

SUMMARY

Accordingly, the present disclosure has been made in view of the above-mentioned problems occurring in the related art, and it is an object of the present disclosure to provide a driving belt inspection device and method for a wafer transfer module that is capable of detecting reduction in the tension applied to a driving belt of the wafer transfer module.

It is another object of the present disclosure to provide a driving belt inspection device and method for a wafer transfer module that is capable of measuring the rate of change of instantaneous current of a motor, while the motor is operating, to inspect the deterioration of a driving belt.

To accomplish the above-mentioned objects, according to one aspect of the present disclosure, there is provided a driving belt inspection device for a wafer transfer module, including: a data receiving unit for receiving current data of a motor connected to a driving belt; a calculation unit for calculating the rate of change of instantaneous current of the motor according to the received current data and acquiring a calculated value for inspection according to the calculated rate of change of instantaneous current of the motor; and a result determination unit for determining, if the calculated value is lower than a first reference value, that the driving belt is in a normal operation state, and determining, if the calculated value is higher than a second reference value, that the driving belt is in an abnormal operation state.

According to the present disclosure, desirably, the calculated value may be a value calculated to be verified through a sequential probability ratio test.

According to the present disclosure, desirably, the calculated value may be a value calculated according to the peak value and variance of the rate of change of instantaneous current.

According to the present disclosure, desirably, changes in the peak value and variance of the rate of change of instantaneous current may be reflected to acquire the calculated value.

According to the present disclosure, desirably, the result determination unit may delay a determination as to whether the driving belt is in the normal or abnormal operation state if the calculated value is between the first reference value and the second reference value.

According to the present disclosure, desirably, if the determination through the result determination unit is delayed, the calculation unit may re-acquire the calculated value through the current data and next current data.

To accomplish the above-mentioned objects, according to another aspect of the present disclosure, there is provided a driving belt inspection method for a wafer transfer module, including the steps of: receiving current data of a motor connected to a driving belt; calculating the rate of change of instantaneous current of the motor according to the received current data and acquiring a calculated value for inspection according to the calculated rate of change of instantaneous current of the motor; and if the calculated value is lower than a first reference value, determining that the driving belt is in a normal operation state, and if the calculated value is higher than a second reference value, determining that the driving belt is in an abnormal operation state.

According to the present disclosure, desirably, the calculated value may be a value calculated to be verified through a sequential probability ratio test.

According to the present disclosure, desirably, the calculated value may be a value calculated according to the peak value and variance of the rate of change of instantaneous current.

According to the present disclosure, desirably, changes in the peak value and variance of the rate of change of instantaneous current may be reflected to acquire the calculated value.

According to the present disclosure, desirably, the determining step may delay a determination as to whether the driving belt is in the normal or abnormal operation state if the calculated value is between the first reference value and the second reference value.

According to the present disclosure, desirably, the driving belt inspection method may further include the step of, if the determination is delayed, re-acquiring the calculated value through the current data and next current data.

BRIEF DESCRIPTION OF THE DRAWINGS

The above and other objects, features and advantages of the present disclosure will be apparent from the following detailed description of the preferred embodiments of the disclosure in conjunction with the accompanying drawings, in which:

FIG. 14 is a table showing the peak values and distribution in the rate of change of the instantaneous current of the motor;

DETAILED DESCRIPTION

Figure 1:
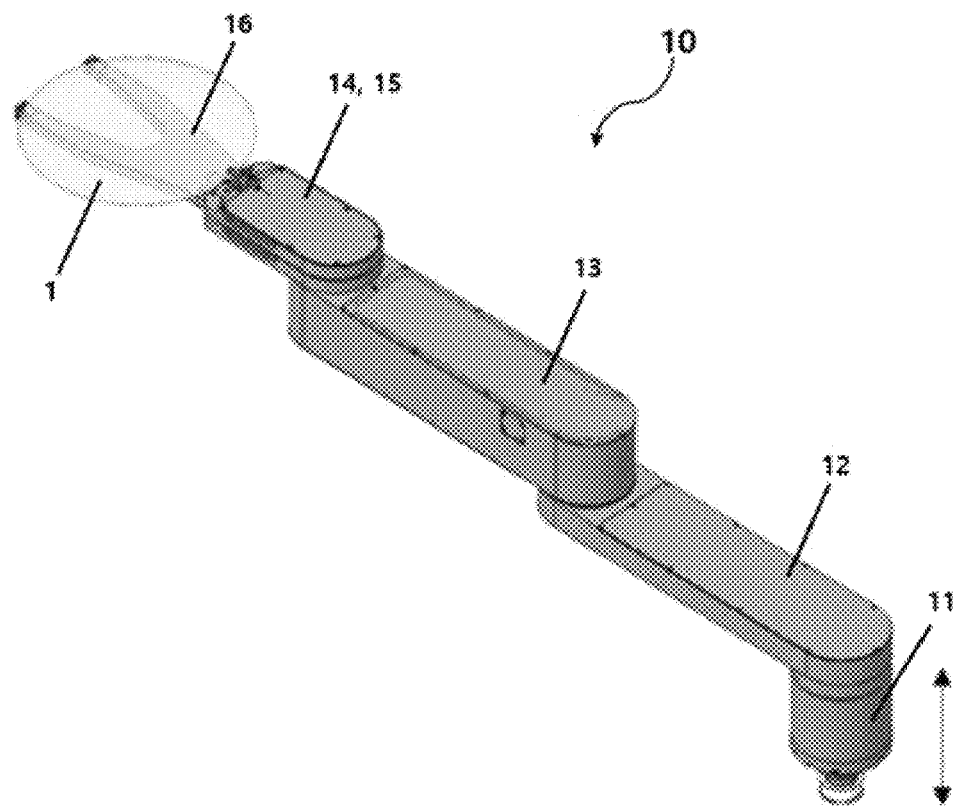
FIG. 1 is a perspective view showing a wafer transfer module in an exemplary embodiment of the present disclosure.

Objects, characteristics, and advantages of the present disclosure will be more clearly understood from the detailed description as will be described below and the attached drawings. Before the present disclosure is disclosed and described, it is to be understood that the disclosed embodiments are merely exemplary of the disclosure, which can be embodied in various forms. Therefore, specific structural and functional details disclosed herein are not to be interpreted as limiting, but merely as a basis for the claims and as a representative basis for teaching one of ordinary skill in the art to variously employ the present disclosure in virtually any appropriately detailed structure.

Terms used in the present disclosure will be explained briefly, and next, embodiments according to the present disclosure will be described in detail.

The terms used in the present disclosure are to be given their ordinary and customary meaning to a person of ordinary skill in the art, and are not to be limited to a special or customized meaning unless expressly so defined herein. It should be noted that the use of particular terminology when describing certain features or aspect of the disclosure should not be taken to imply that the terminology is being re-defined herein to be restricted to include any specific characteristics of the features or aspects of the disclosure with which that terminology is associated.

In the description, when it is said that one portion is described as "includes" any component, one element further may include other components unless no specific description is suggested. The terms 'parts', 'units', and 'modules', as used herein, are intended to refer to the unit processing at least one function or operation, which may be implemented by software, a hardware component such as field-programmable gate array (FPGA) or application specific integrated circuit (ASIC), or a combination thereof. However, the terms 'parts', 'units', and 'modules' are not limited to the software or hardware component. The 'parts', 'units', and 'modules' may be configured to be in a storage medium addressable or to play one or more processors. Accordingly, for example, the term 'part' may include components such as software components, object-oriented software components, class components, and task components, processes, functions, attributes, procedures, sub-routines, segments of program codes, drivers, firmware, microcodes, circuits, data, database, data structures, tables, arrays, and variables.

The present disclosure is disclosed with reference to the attached drawings to allow embodiments to be carried out easily by those skilled in the art. If it is determined that the detailed explanation on the well known technology related to the present disclosure makes the scope of the present disclosure not clear, the explanation will be avoided for the brevity of the description.

Terms, such as the first, the second, and the like, may be used to describe various elements, but the elements should not be restricted by the terms. The terms are used to only distinguish one element from the other element. For example, a first element may be named a second element without departing from the scope of the present disclosure. Likewise, a second element may be named a first element. A term 'and/or' includes a combination of a plurality of relevant and described items or any one of a plurality of related and described items.

Figure 2:
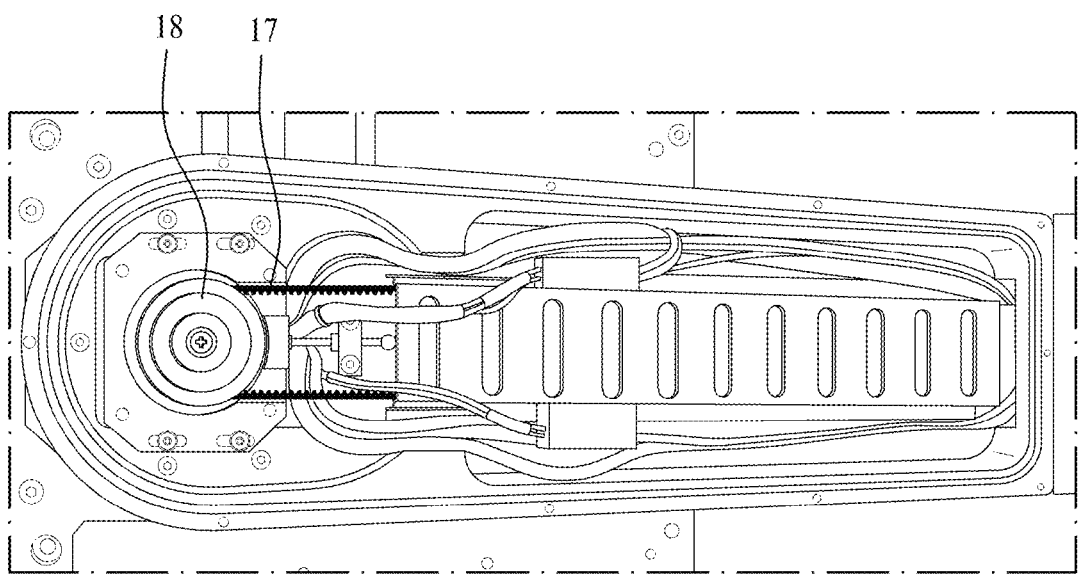
FIG. 2 is a photograph showing a motor and a belt of the wafer transfer module in the exemplary embodiment of the present disclosure.

FIG. 1 is a perspective view showing a wafer transfer module in an exemplary embodiment of the present disclosure, and FIG. 2 is a photograph showing a motor and a belt of the wafer transfer module in the exemplary embodiment of the present disclosure.

FIGS. 1 and 2 show the shape or configuration of a wafer transfer module in an exemplary embodiment of the present disclosure for the purpose of explaining a driving belt inspection device according to an embodiment of the present disclosure, and the wafer transfer module may be not limited in the shape or configuration as shown in FIGS. 1 and 2, but it may have various shapes or configurations adapted to transfer a wafer.

Referring to FIG. 1, a wafer transfer module 10 includes a plurality of arm structures 11, 12, 13, 14 and 15 and an end effector 16.

The first arm structure 11 is connected to the second arm structure 12. The first arm structure 11 is configured to move in upward and downward directions to allow the second arm structure 12 to move up and down. Accordingly, the end effector 16 moves in upward and downward directions.

The second to fifth arm structures 12 to 15 each include a motor and a driving belt. The motor is a Permanent Magnet Synchronous Motor (PMSM), but it may not be limited thereto.

The second to fifth arm structures 12 to 15 rotate with respect to other arm structures through the respective motors and driving belts. For example, as a rotary shaft of the second arm structure 12 is connected to the first arm structure 11, the second arm structure 12 rotates with respect to the rotary shaft connected to the first arm structure 11. Further, as a rotary shaft of the third arm structure 13 is connected to the second arm structure 12, the third arm structure 13 rotates with respect to the rotary shaft connected to the second arm structure 12. Furthermore, as rotary shafts of the fourth arm structure 14 and the fifth arm structure 15 are connected to the third arm structure 13, the fourth arm structure 14 and the fifth arm structure 15 rotate with respect to the rotary shafts connected to the third arm structure 13.

According to the embodiment of the present disclosure, the end effector 16 is connected to the fourth arm structure 14 and the fifth arm structure 15. The end effector 16 is configured to seat or grasp a wafer 1. Accordingly, the wafer 1 is transferred to a given position by means of the end effector 16.

According to the embodiment of the present disclosure, the wafer transfer module 10 is configured to allow the end effector 16 to be transferred to various directions and positions according to the motions of the first to fifth arm structures 11 to 15, so that through the end effector 16, the wafer 1 is transferred to the various directions and positions.

Referring to FIG. 2, a motor 18 and a driving belt 17 are disposed inside the third arm structure 13. An explanation of the motor and the driving belt as shown in FIG. 2 may not be limited to the third arm structure 13, but it will be given for motors and driving belts disposed inside other arm structures.

As shown in FIG. 2, the motor 18 is connected to the driving belt 17. As the motor 18 rotates, the driving belt 17 connected to the motor 18 performs endless rotation. The driving force generated from the motor 18 is provided as a driving force for rotating the corresponding arm structure through the driving belt 17 and the corresponding rotary shaft.

Further, the driving belt 17 may be deteriorated due to the loads applied repeatedly thereto in a process of transferring the wafer 1 or rotating the corresponding arm structure. Accordingly, a slip between the motor 18 and the driving belt 17 may occur to fail to appropriately control the rotation of the corresponding arm structure, thereby making it possible that the wafer transfer module 10 or the equipment located close thereto may be damaged or broken.

Hereinafter, a method for inspecting a degree of deterioration of the driving belt through the driving belt inspection device for the wafer transfer module according to the present disclosure will be explained with reference to the attached drawings.

Figure 3:
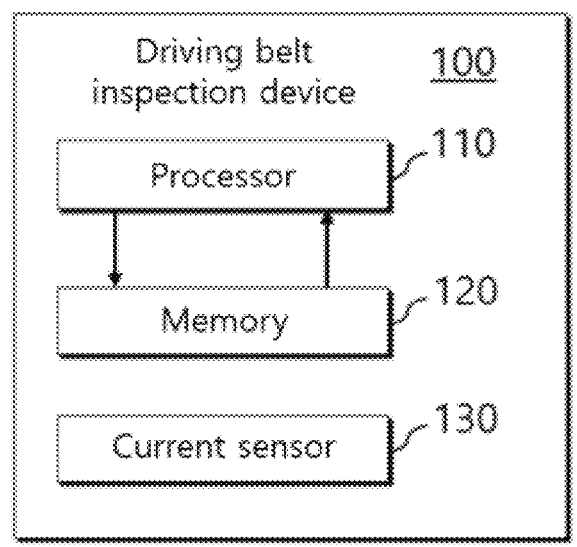
FIG. 3 is a block diagram showing a driving belt inspection device for a wafer transfer module according to an embodiment of the present disclosure.
Figure 4:
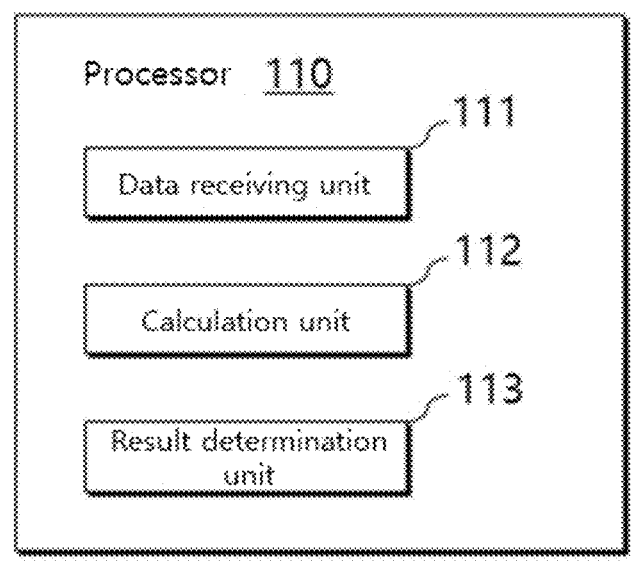
FIG. 4 is a block diagram showing a processor of the driving belt inspection device for the wafer transfer module according to the embodiment of the present disclosure.

FIG. 3 is a block diagram showing a driving belt inspection device for a wafer transfer module according to an embodiment of the present disclosure. FIG. 4 is a block diagram showing a processor of the driving belt inspection device for the wafer transfer module according to the embodiment of the present disclosure.

Referring to FIGS. 3 and 4, a driving belt inspection device 100 for a wafer transfer module according to an embodiment of the present disclosure may be an information processing device including a processor 110, a memory 120, and a current sensor 130. For example, an electronic device, which has the driving belt inspection device 100 for the wafer transfer module according to an embodiment of the present disclosure, may include an electronic device for implementing all types of operations and/or control. For example, the information processing device may include at least one of devices capable of processing information, such as desktop computers, laptops, server computers, and the like.

According to an embodiment of the present disclosure, the driving belt inspection device 100 may be a device included in the wafer transfer module 10. According to another embodiment of the present disclosure, the driving belt inspection device 100 may be a device separated from the wafer transfer module 10.

According to an embodiment of the present disclosure, the processor 110 executes calculation, processing, control, and/or analysis of programs for performing overall operations or some of the operations of the driving belt inspection device 100 for the wafer transfer module 10.

According to an embodiment of the present disclosure, the driving belt inspection device 100 for the wafer transfer module 10 represents a device that receives current data of the motor of the wafer transfer module 10, measures the rate of change of instantaneous current of the motor according to the received current data, and detects a degree of reduction in the tension of the driving belt according to the measured result. An explanation of the operations of the driving belt inspection device 100 will be given in detail later.

According to an embodiment of the present disclosure, the processor 110 drives a pre-embedded program and/or a program stored in the memory 120 to execute given operations. In this case, the program stored in the memory 120 is a program stored directly by a designer or acquired through electronic software distribution accessible via a wired/wireless communication network. According to an exemplary embodiment of the present disclosure, the processor 110 may include a Central Processing Unit (CPU), a Micro Controller Unit (MCU), a Micro Processor (Micom), an Application Processor (AP), an Electronic Controlling Unit (ECU), and/or other electronic devices for processing all types of calculation processing and generating control signals. According to another embodiment of the present disclosure, the processor 110 may include a single physical device, and otherwise, it may include two or more physical devices.

According to an embodiment of the present disclosure, the memory 120 is a storage medium that stores all types of data needed for the operations of the processor 110 temporarily or non-temporarily.

According to an embodiment of the present disclosure, the memory 120 may include at least one of a main memory and an auxiliary memory. The main memory may include a semiconductor storage medium such as a Read Only Memory (ROM) and/or a Random Access Memory (RAM). The auxiliary memory may include at least one storage medium that stores data permanently or semi-permanently, such as a Solid State Drive (SSD), a flash memory, a Hard Disc Drive (HDD), a Secure Digital (SD) card, a magnetic drum, a magnetic tape, a Compact Disc (CD), a Digital Versatile Disc (DVD), a laser disc, a magneto-optical disc and/or a floppy disc.

According to an embodiment of the present disclosure, the current sensor 130 is a sensor that detects the current applied to the motor (e.g., PMSM) of the wafer transfer module 10. According to an embodiment of the present disclosure, the current sensor 130 measures (or senses) the current applied to the motor of the wafer transfer module 10 and thus acquires current data. The current data of the motor is provided to the processor 110 or stored in the memory 120.

The driving belt inspection device 100 for the wafer transfer module 10 according to the embodiment of the present disclosure measures the rate of change of instantaneous current of the motor and thus inspects the reduction of tension of the driving belt.

For example, the motor as the PMSM is widely used as a motor for the wafer transfer module due to fast acceleration and speed reduction, constant torque over the entire speed range, and the like.

As the speed and torque of the motor as the PMSM are controlled, the motions of the corresponding arm structure of the wafer transfer module are controllable. To compensate for an error between a target position and an actual position of the arm structure, in the process where the motions of the arm structure are controlled, the control in the speed and torque of the motor as the PMSM is consistently changed.

As the tension applied to the driving belt becomes high, a link connection between the motor and the arm structure becomes stronger, and contrarily, as the tension applied to the driving belt becomes low, the link connection between the motor and the arm structure becomes weakened.

If the tension applied to the driving belt is high, further, it acts as an interference element (e.g., disturbance) in controlling the position of the arm structure through the motor, thereby causing the speed and torque control of the motor to be changed more frequently. Contrarily, if the tension applied to the driving belt is low, the number of times the interference element appears becomes decreased to reduce the number of times the speed and torque control of the motor are changed.

As a result, if the tension applied to the driving belt is high, the number of times the current applied to the motor is changed relatively increases, and contrarily, if the tension applied to the driving belt is low, the number of times the current applied to the motor is changed relatively decreases.

However, if the tension applied to the driving belt is low, a slip between the motor and the driving belt occurs, which causes the wafer and the equipment located close to the wafer to be damaged or broken.

The driving belt inspection device 100 for the wafer transfer module 10 according to the embodiment of the present disclosure measures the rate of change of the current of the motor, measures the degree of tension applied to the driving belt, and detects the degree of deterioration of the driving belt.

According to an embodiment of the present disclosure, the processor 110 includes a data receiving unit 11, a calculation unit 112, and a result determination unit 113. According to an embodiment of the present disclosure, the data receiving unit 11, the calculation unit 112, and the result determination unit 113 may operate softwarily or hardwarily.

The processor 110 of the driving belt inspection device 100 for the wafer transfer module 10 according to the embodiment of the present disclosure includes the data receiving unit 11 for receiving the current data of the motor, the calculation unit 112 for calculating a verification value according to the received current data, and the result determination unit 113 for determining whether a state of the driving belt is normal or abnormal according to the calculated verification value.

For example, the data receiving unit 111 receives the current data of the motor connected to the driving belt as an inspection object. For example, the current data of the motor are current values measured in a cyclic range of 1 kHz corresponding to maximum resolution of the wafer transfer module 10, but they may not be limited thereto.

The current data inputted to the data receiving unit 111 are calculated for the verification value in the calculation unit 112. An explanation of the calculating process will be given in detail later.

The calculation unit 112 calculates the verification value according to the current data.

For example, the calculation unit 112 calculates the rate of change of instantaneous current according to the current data. For example, the rate of change of instantaneous current is calculated in the unit of 1 ms.

Figure 5:
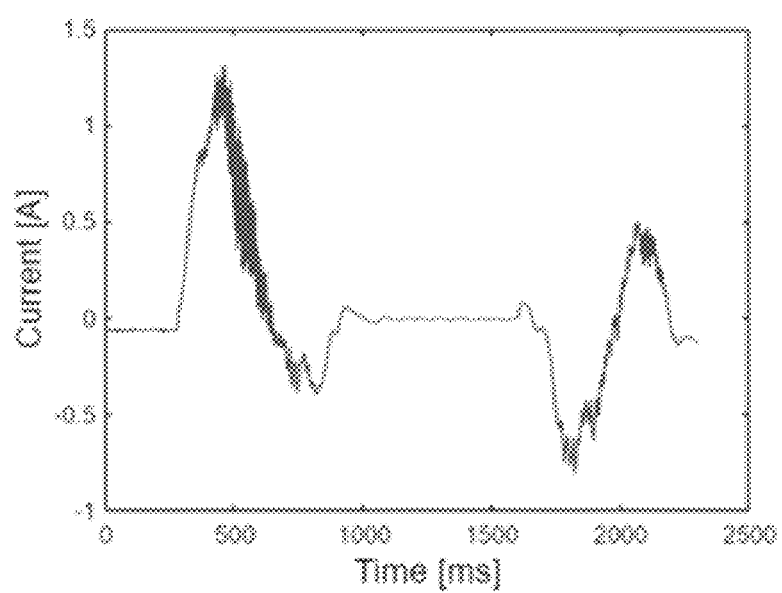
FIGS. 5 and 6 are graphs showing a process of calculating the rate of change of instantaneous current according to an exemplary embodiment of the present disclosure.
Figure 6:
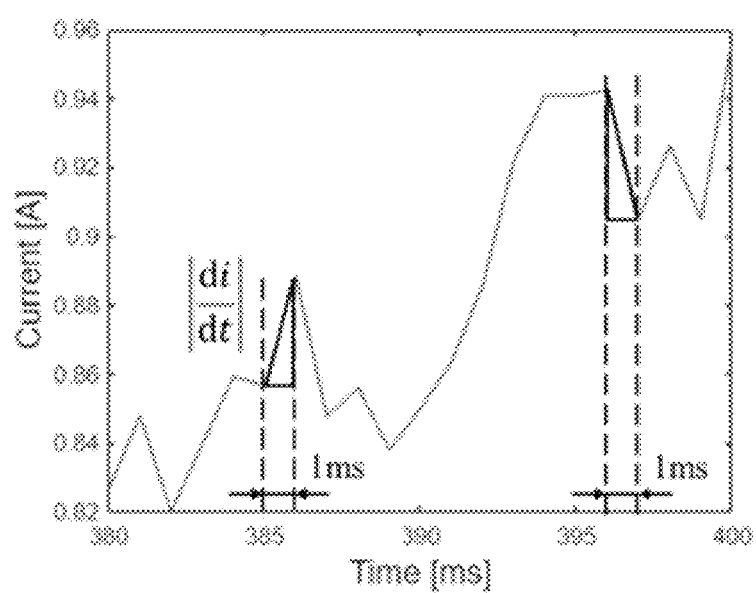

FIGS. 5 and 6 are graphs showing a process of calculating the rate of change of instantaneous current according to an exemplary embodiment of the present disclosure.

FIG. 5 is a graph showing the current data provided from the data receiving unit 111, which shows the current applied to the motor over one cycle. FIG. 6 is a graph showing a given zone among the zones of FIG. 5.

Referring to FIG. 6, the rate of change of instantaneous current is calculated as the amount of change (di/dt) of current in the time unit of 1 ms. Further, the rate of change of instantaneous current is calculated in the entire time range of the current applied to the motor over one cycle. Further, one cycle is one cycle of the motor during which the arm structure starts an operation for transferring one wafer, completes an ending operation of the wafer transfer, and returns to its starting operation.

The calculation unit 112 calculates the verification value according to the rate of change of instantaneous current. The verification value may be the value calculated to verify the data of the rate of change of instantaneous current through a Sequential Probability Ratio Test (hereinafter, referred to as 'SPRT'). The SPRT is a sequential statistical binary hypothesis test developed by Wald (in 1945).

Figure 7:
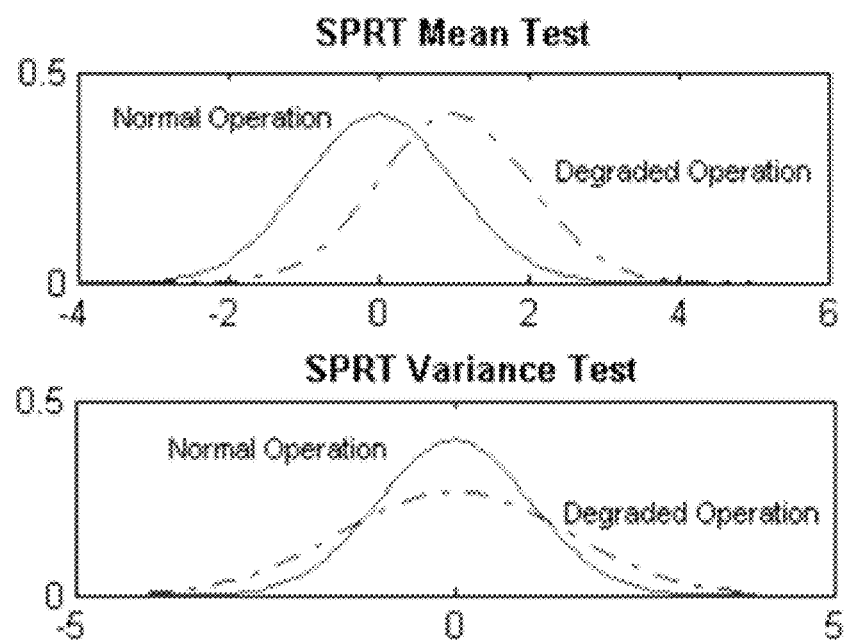
FIG. 7 is a graph showing the Gaussian probability density function for explaining a Sequential Probability Ratio Test (SPRT)-based verification method.

FIG. 7 is a graph showing the Gaussian probability density function for explaining an SPRT-based verification method.

For example, if the received data are in normal operation states, they are defined as the Gaussian probability density function having the mean 0 and variance $\sigma^2$.

For example, if the received data are in abnormal operation states or degraded operation states, they are defined as the Gaussian probability density function where the mean moves, as shown in the upper graph of FIG. 7, or the variance moves, as shown in the lower graph of FIG. 7, unlike the received data being in the normal operation states.

For example, if the received data are in abnormal operation states, the Gaussian probability density function has the distribution with the variance $\sigma^2/V$, unlike the variance $\sigma^2$ in the normal operation states.

In this case, the measured value V is used in acquiring the calculated value.

For the SPRT, generally, the following Mathematical expression 1 is used.

$$SPRT_{var}^{inv} = \frac{1}{2\sigma^2}(1-V)\sum_{i=1}^{n} x_i^2 + \frac{n}{2}\ln V \quad \text{[Mathematical expression 1]}$$

When the SPRT is performed, generally, the value calculated by the Mathematical expression 1 is compared with a plurality of reference values, thereby verifying whether the received data are in normal or abnormal operation states. However, the Mathematical expression 1 does not consider changes in mean and variance of the received data when the driving belt is deteriorated and changed in tension, and according to the present disclosure, therefore, the following Mathematical expression 2 is suggested and used for the SPRT.

[Mathematical expression 2]
$$SPRT_{var}^{mod} = \frac{1}{2\sigma^2}(1-V)\sum_{i=1}^{n}\left(x_i - \frac{\sum_{i=1}^{n}x_i}{n}\right)^2 + \frac{n}{2}\ln V$$

According to an embodiment of the present disclosure, the SPRT value in the Mathematical expression 2 is defined as a calculated value. The value V represents a value for compensating for comparative variance with the normal state. The value xi represents a mean value of the rate of change of instantaneous current of the motor over each cycle. The value n represents the number of cycles as test objects.

For example, the mean values of the rates of changes of instantaneous current of the motor over 1000 cycles of the wafer transfer module may be x1, x2, . . . , and x1000. For example, x1 represents a mean value of the rate of change of instantaneous current of the motor over the first cycle, and x1000 represents a mean value of the rate of change of instantaneous current of the motor over the 1000th cycle. The respective cycles have 1, 2, . . . , and 1000 as their value n.

According to another embodiment of the present disclosure, the xi in the Mathematical expression 2 is a peak value of the rate of change of instantaneous current of the motor over each cycle.

For example, the peak values of the rates of changes of instantaneous current of the motor over 1000 cycles of the wafer transfer module may be x1, x2, . . . , and x1000. For example, x1 represents a peak value of the rate of change of instantaneous current of the motor over the first cycle, and x1000 represents a peak value of the rate of change of instantaneous current of the motor over the 1000th cycle. The respective cycles have 1, 2, . . . , and 1000 as their value n.

For example, the calculation unit 112 acquires the value calculated through the Mathematical expression 2.

The calculated value is compared with a first reference value or a second reference value through the result determination unit 113. The first reference value is a value pre-designated by a user. The result determination unit 113 determines that if the calculated value is lower than the first reference value, the rate of change of instantaneous current of the motor is in normal distribution. The second reference value is a value pre-designated by the user. The result determination unit 113 determines that if the calculated value is higher than the second reference value, the rate of change of instantaneous current of the motor is in abnormal distribution.

Further, the second reference value is higher than the first reference value.

If the value calculated in the calculation unit 112 according to the current data of the motor over the first cycle is between the first reference value and the second reference value, the result determination unit 113 determines that the rate of change of instantaneous current of the motor is not recognized as being in normal or abnormal distribution, which is defined as a determination delay state. In the case of the determination delay state, the calculation unit 112 acquires the value calculated according to the current data over the first cycle and the current data over the second cycle again. In this case, if the calculated value is lower than the first reference value or higher than the second reference value, the result determination unit 113 determines that the rate of change of instantaneous current of the motor is in normal or abnormal distribution. Contrarily, if the value calculated is between the first reference value and the second reference value, the result determination unit 113 determines that the rate of change of instantaneous current of the motor is not recognized as being in normal or abnormal distribution, and accordingly, the calculation unit 112 acquires the value calculated through the current data over the first cycle, the current data over the second cycle, and the current data over the third cycle again.

In this case, the first reference value A is defined as $$A = \ln\frac{\beta}{1-\alpha},$$

and the second reference value B as $$B = \ln\frac{1-\beta}{\alpha},$$

wherein α and β are constants designated according to the user's setting, but they may not be limited thereto.

Figure 17:
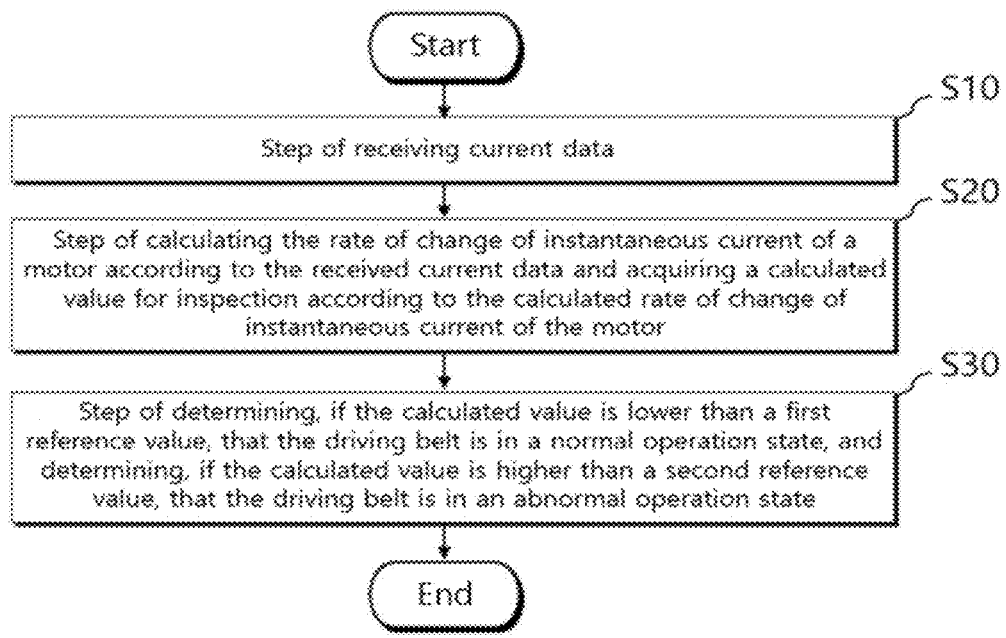
FIG. 17 is a flowchart showing a driving belt inspection method for a wafer transfer module according to an embodiment of the present disclosure.

FIG. 17 is a flowchart showing a driving belt inspection method for a wafer transfer module according to an embodiment of the present disclosure.

Referring to FIG. 17, a driving belt inspection method for a wafer transfer module according to an embodiment of the present disclosure includes the steps of: receiving current data of a motor connected to a driving belt (at step S10); calculating the rate of change of instantaneous current of the motor according to the received current data and acquiring a calculated value for inspection according to the calculated rate of change of instantaneous current of the motor (at step S20); and if the calculated value is lower than a first reference value, determining that the driving belt is in a normal operation state, and if the calculated value is higher than a second reference value, determining that the driving belt is in an abnormal operation state (at step S30).

Hereinafter, test examples for explaining a verification process through the driving belt inspection device for the wafer transfer module according to exemplary embodiments of the present disclosure will be described.

The verification process was performed through the motor and the driving belt of the third arm structure 13 as shown in FIG. 1.

Tests were performed under the conditions where the driving belts of the third arm structure 13 had four types of tension, that is, reference tension, tension about 10% lower than the reference tension, tension about 20% lower than the reference tension, and the lowest tension in operating the third arm structure 13. The four types of tension were mean values measured five times using tension meters.

The measured four types of tension of the driving belts were 55 N, 49 N, 43 N, and 10 N. Next, 1000 cycle operations were performed through the respective driving belts, thereby acquiring the current data over all cycles.

FIGS. 8 to 11 are graphs showing the current values measured over one cycle of the motor.

Figure 8:
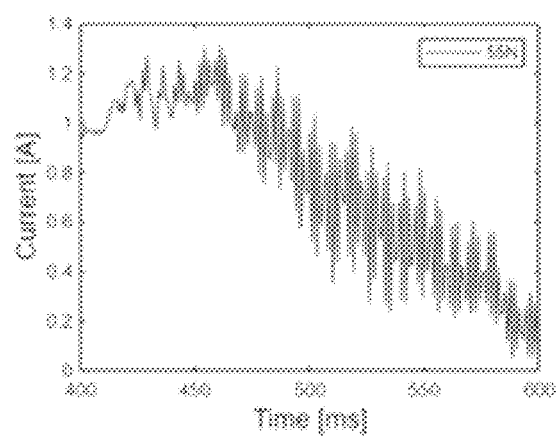
FIGS. 8 to 11 are graphs showing the current values measured over one cycle of a motor.
Figure 9:
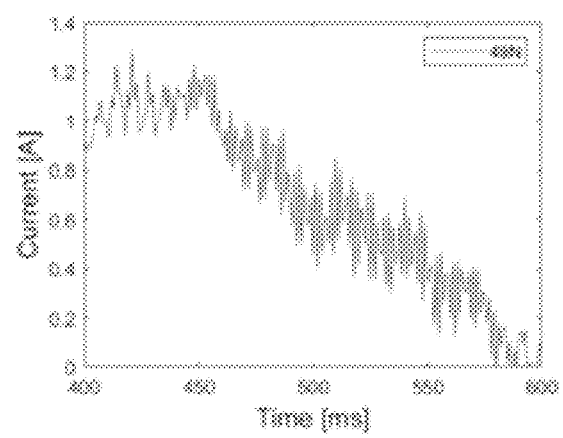
Figure 10:
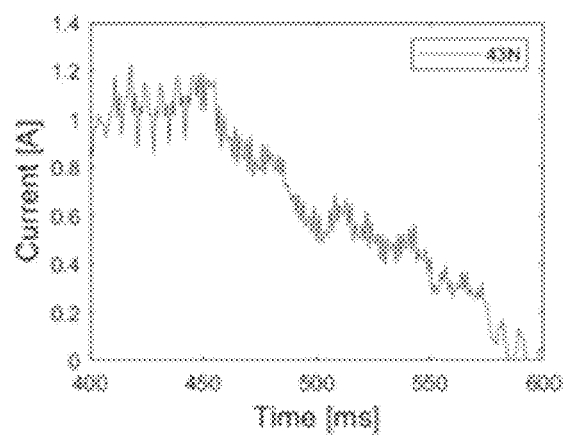
Figure 11:
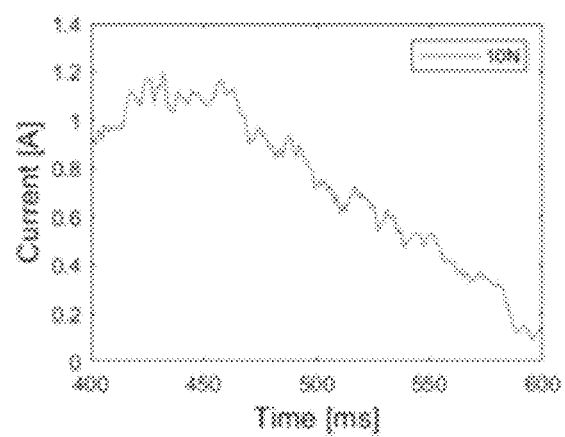

FIG. 8 shows a graph when the driving belt has the tension of 55 N, FIG. 9 shows a graph when the driving belt has the tension of 49 N, FIG. 10 shows a graph when the driving belt has the tension of 43 N, and FIG. 11 shows a graph when the driving belt has the tension of 10 N.

Referring to FIGS. 8 to 11, it is appreciated that the current of the motor is changed frequently, and in specific, it is found that as the tension of the driving belt becomes low, the amount of change of current of the motor becomes decreased.

Figure 12:
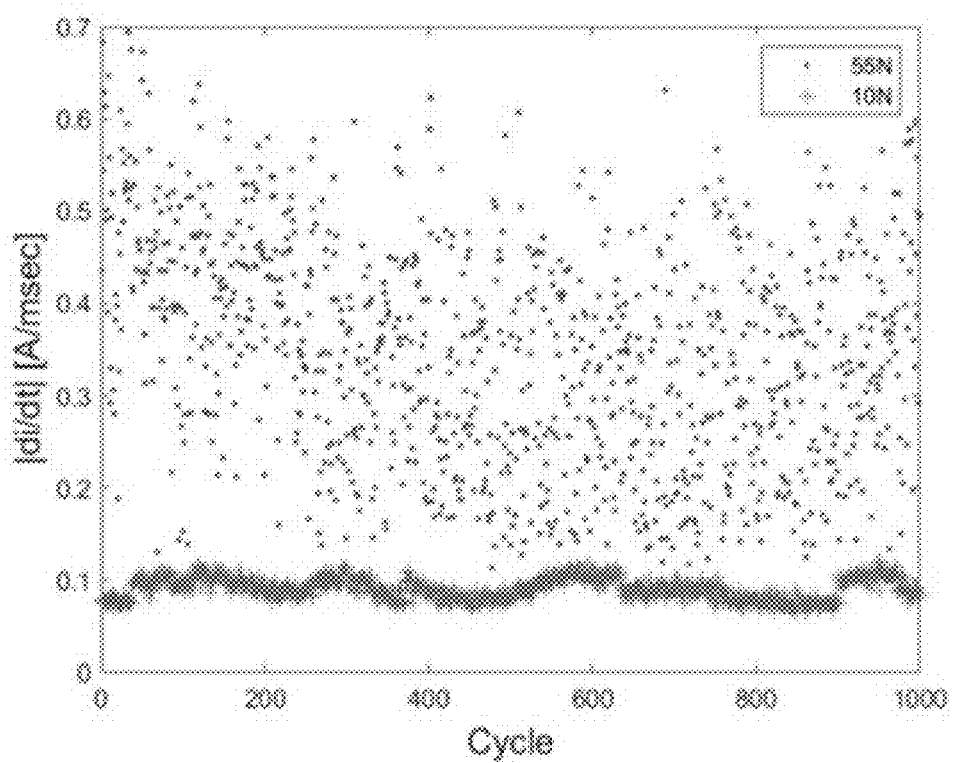
FIG. 12 is a distribution graph showing the rate of change of the instantaneous current of the motor.

FIG. 12 is a distribution graph showing the rate of change of the instantaneous current of the motor. In FIG. 12, distributions are shown when the driving belt has the tension of 55 N and the driving belt has the tension of 10 N, and it is found that a deviation in the distribution when the driving belt being in a normal operation state has the tension of 55 N is higher than a deviation in the distribution when the driving belt being in an abnormal operation state has the tension of 10 N.

Figure 13:
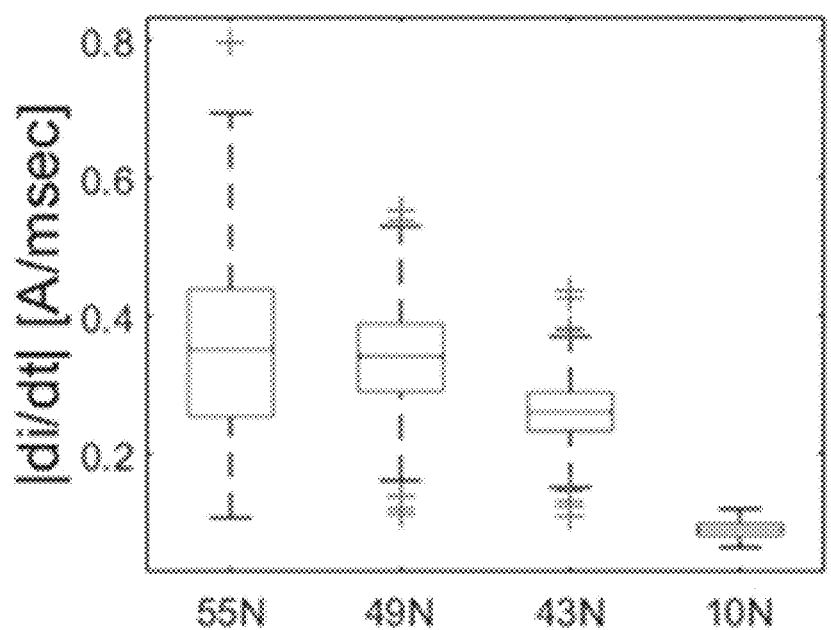
FIG. 13 is a graph showing the peak values and distribution in the rate of change of the instantaneous current of the motor.

FIG. 13 is a graph showing the peak values and distribution in the rate of change of the instantaneous current of the motor. FIG. 14 is a table showing the peak values and distribution in the rate of change of the instantaneous current of the motor. Referring to FIGS. 13 and 14, it is appreciated that when the driving belt being in a normal operation state has the tension of 55 N, the rate of change of the instantaneous current of the motor has the largest distribution, and when the driving belt has the tension of 49 N or under, the distribution becomes gradually decreased.

Figure 15:
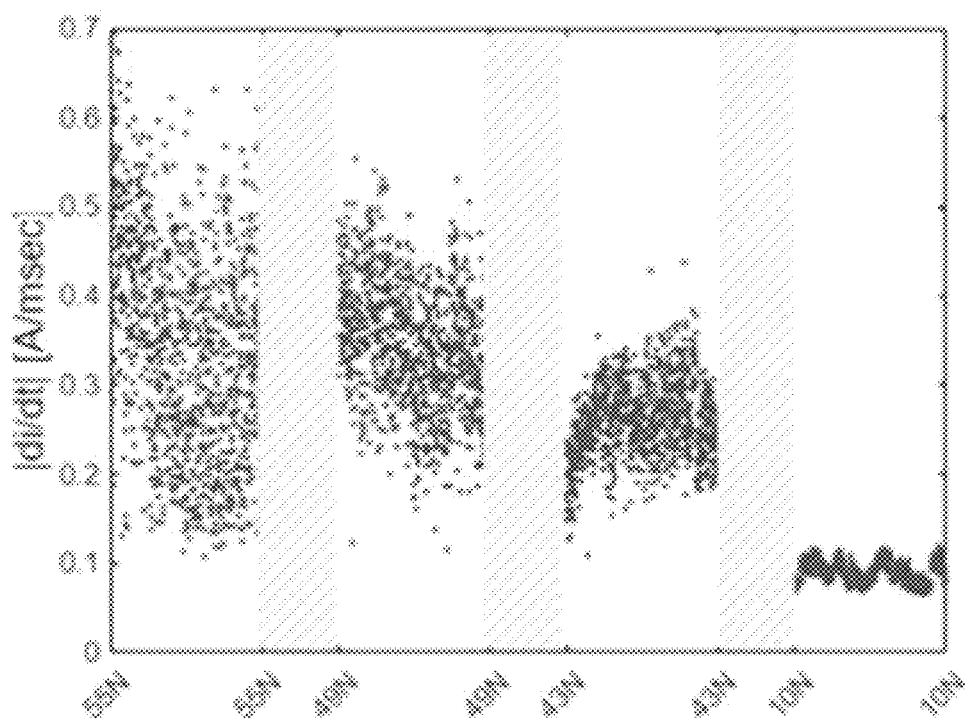
FIG. 15 is a graph showing the rate of change of the instantaneous current of the motor over all cycles.
Figure 16:
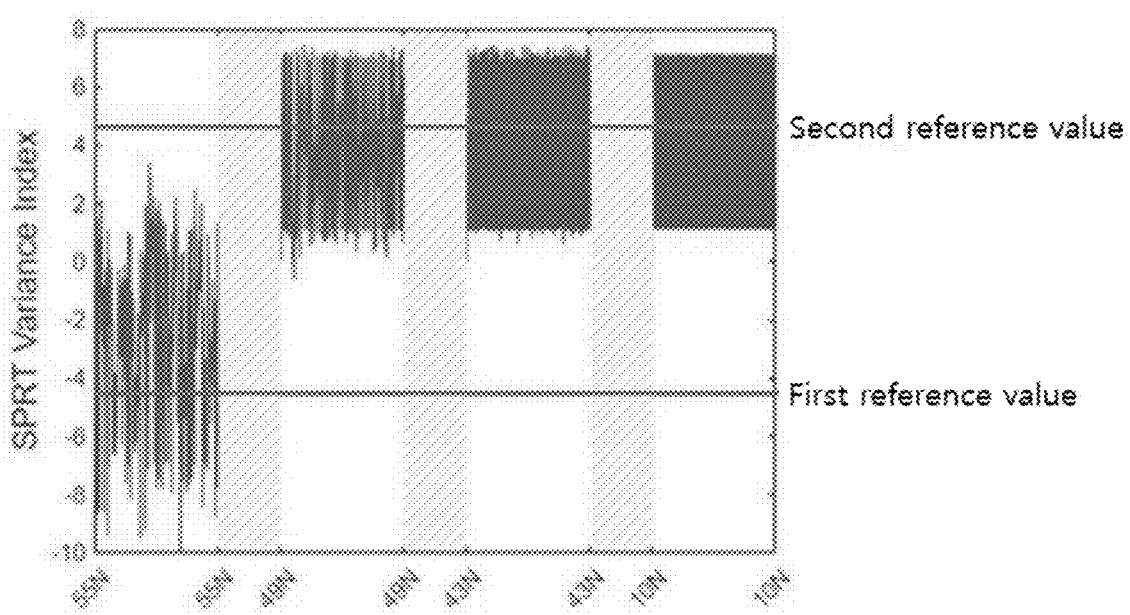
FIG. 16 is a graph showing the results obtained by calculating the rate of change of the instantaneous current of the motor over all cycles through a Mathematical expression 2 as will be discussed later.

FIG. 15 is a graph showing the rate of change of the instantaneous current of the motor over all cycles, and FIG. 16 is a graph showing the results obtained by calculating the rate of change of the instantaneous current of the motor over all cycles through the Mathematical expression 2.

Referring to FIGS. 15 and 16, when the driving belt, which includes zones where the calculated values reach the first reference value or are lower than the first reference value, has the tension of 55 N, it is checked that the rate of change of the instantaneous current of the motor is in normal distribution.

Referring to FIGS. 15 and 16, when the driving belts, which include zones where the calculated values reach the second reference value or are higher than the second reference value, have the tension of 49 N, 43 N, and 10 N, it is checked that the rate of change of the instantaneous current of the motor are in abnormal distribution.

The device and method as mentioned above may be implemented in a software component, a hardware component, and/or a combination thereof. For example, the device and the components as mentioned in the embodiments of the present disclosure may be implemented using one or more general-purpose or special-purpose computers, such as a processor, a controller, an arithmetic logic unit, a digital signal processor, a microcomputer, a field programmable array (FPA), a programmable logic unit (PLU), a microprocessor, or another device for executing and responding instructions. The processing device may execute an operating system (OS) and one or more software applications performed on the operating system. Further, the processing device responds to the execution of the software and performs the access to data, data storage, data control, data processing, and data generation. For the conveniences of understanding, one processing device is used, but it is appreciated by a person having ordinary skill in the art that the processing device may include a plurality of processing elements and/or various types of processing elements. For example, the processing device may include a plurality of processors or one processor and one controller. Further, the processing device may have other processing configurations such as parallel processors.

The method according to the embodiment of the present disclosure may be implemented in the form of program instructions that can be performed through various computers and recorded in a computer readable recording medium. The computer readable medium may include a program command, a data file, a data structure, and the like independently or in combination. The program instruction recorded in the recording medium is specially designed and constructed for the present disclosure, but may be well known to and may be used by those skilled in the art of computer software. The computer readable recording medium may include a magnetic medium such as a hard disc, a floppy disc, and a magnetic tape, an optical recording medium such as a Compact Disc Read Only Memory (CD-ROM) and a Digital Versatile Disc (DVD), a magneto-optical medium such as a floptical disk, and a hardware device specifically configured to store and execute program instructions, such as a Read Only Memory (ROM), a Random Access Memory (RAM), and a flash memory. Further, the program command may include a machine language code generated by a compiler and a high-level language code executable by a computer through an interpreter and the like. The hardware device may be configured to operate as one or more software modules in order to perform operations of the present disclosure, and vice versa.

As described above, the driving belt inspection device and method for the wafer transfer module according to the embodiments of the present disclosure can detect the reduction in tension applied to the driving belt of the wafer transfer module, thereby checking the remaining useful life of the driving belt.

The particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter.

What is claimed is:

1. A driving belt inspection device for a wafer transfer module, comprising:
   a data receiving unit for receiving current data of a motor connected to a driving belt;
   a calculation unit for calculating the rate of change of instantaneous current of the motor according to the received current data and acquiring a calculated value for inspection according to the calculated rate of change of instantaneous current of the motor; and
   a result determination unit for determining, if the calculated value is lower than a first reference value, that the driving belt is in a normal operation state, and determining, if the calculated value is higher than a second reference value, that the driving belt is in an abnormal operation state.

2. The driving belt inspection device according to claim 1, wherein the calculated value is a value calculated to be verified through a sequential probability ratio test.

3. The driving belt inspection device according to claim 2, wherein the calculated value is a value calculated according to the peak value and variance of the rate of change of instantaneous current.

4. The driving belt inspection device according to claim 3, wherein changes in the peak value and variance of the rate of change of instantaneous current are reflected to acquire the calculated value.

5. The driving belt inspection device according to claim 1, wherein the result determination unit delays a determination as to whether the driving belt is in the normal or abnormal operation state if the calculated value is between the first reference value and the second reference value.

6. The driving belt inspection device according to claim 5, wherein if the determination through the result determination unit is delayed, the calculation unit re-acquires the calculated value through the current data and next current data.

7. A driving belt inspection method for a wafer transfer module, comprising the steps of:
receiving current data of a motor connected to a driving belt;
calculating the rate of change of instantaneous current of the motor according to the received current data and acquiring a calculated value for inspection according to the calculated rate of change of instantaneous current of the motor; and
if the calculated value is lower than a first reference value, determining that the driving belt is in a normal operation state, and if the calculated value is higher than a second reference value, determining that the driving belt is in an abnormal operation state.

8. The driving belt inspection method according to claim 7, wherein the calculated value is a value calculated to be verified through a sequential probability ratio test.

9. The driving belt inspection method according to claim 8, wherein the calculated value is a value calculated according to the peak value and variance of the rate of change of instantaneous current.

10. The driving belt inspection method according to claim 9, wherein changes in the peak value and variance of the rate of change of instantaneous current are reflected to acquire the calculated value.

11. The driving belt inspection method according to claim 7, wherein the determining step delays a determination as to whether the driving belt is in the normal or abnormal operation state if the calculated value is between the first reference value and the second reference value.

12. The driving belt inspection method according to claim 11, further comprising the step of, if the determination is delayed, re-acquiring the calculated value through the current data and next current data.

* * * * *